United States Patent
Han et al.

(10) Patent No.: US 9,451,342 B2
(45) Date of Patent: Sep. 20, 2016

(54) METHOD AND APPARATUS FOR MANAGING LINK ON MULTI-LAYER NETWORKS

(71) Applicant: ELECTRONICS AND TELECOMMUNICATIONS RESEARCH INSTITUTE, Daejeon (KR)

(72) Inventors: Kyeong Eun Han, Daejeon (KR); Sun Me Kim, Daejeon (KR); Tae Hyun Kwon, Andong-si (KR); Jong Hyun Lee, Daejeon (KR); Eun Young Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/687,005

(22) Filed: Apr. 15, 2015

(65) Prior Publication Data

US 2015/0373434 A1    Dec. 24, 2015

(30) Foreign Application Priority Data

Jun. 19, 2014  (KR) .................. 10-2014-0074981

(51) Int. Cl.
*H04B 10/00*    (2013.01)
*H04Q 11/00*    (2006.01)
*H04L 12/24*    (2006.01)
*H04L 12/803*   (2013.01)

(52) U.S. Cl.
CPC ........... *H04Q 11/0066* (2013.01); *H04L 41/12* (2013.01); *H04L 47/125* (2013.01); *H04Q 2011/009* (2013.01); *H04Q 2011/0077* (2013.01); *H04Q 2011/0081* (2013.01); *H04Q 2011/0086* (2013.01)

(58) Field of Classification Search
USPC ..................................................... 398/45–60
See application file for complete search history.

(56) References Cited

U.S. PATENT DOCUMENTS

| | | | | |
|---|---|---|---|---|
| 7,778,548 | B2 * | 8/2010 | Yamamoto ......... | H04B 10/1149 372/26 |
| 7,983,568 | B2 * | 7/2011 | Won .................. | H04B 10/1141 398/172 |
| 8,233,806 | B2 * | 7/2012 | Kitaji ................. | H04B 10/1149 398/118 |
| 8,380,081 | B2 * | 2/2013 | Kim ...................... | H04B 3/542 398/154 |

(Continued)

FOREIGN PATENT DOCUMENTS

| | | |
|---|---|---|
| KR | 1020050077938 A | 8/2005 |
| KR | 1020100073963 A | 7/2010 |

(Continued)

*Primary Examiner* — Agustin Bello
(74) *Attorney, Agent, or Firm* — Ladas & Parry LLP (57) ABSTRACT

Provided herein is a link management method and apparatus in a multi-layered network, the method including confirming whether or not set virtual TE link resources can be committed to a virtual TE (traffic engineering) link; in response to the set virtual TE link resources being committable to the virtual TE link, committing the resources to the virtual TE link through resource commitment; in response to the set virtual TE link resources being not committable to the virtual TE link, determining whether or not the virtual TE link is an adaptive virtual TE link; and in response to the virtual TE link being determined as the adaptive virtual TE link and the adaptive bandwidth satisfying TE link setting standards, committing the resources to the virtual TE link.

10 Claims, 3 Drawing Sheets

(56) References Cited

U.S. PATENT DOCUMENTS

| | | | | |
|---|---|---|---|---|
| 8,447,189 B2* | 5/2013 | Kim | H04B 10/1149 | 398/136 |
| 8,521,034 B2* | 8/2013 | Rajagopal | H04B 10/1149 | 398/172 |
| 8,554,084 B2* | 10/2013 | Song | H04B 10/116 | 398/118 |
| 8,565,612 B2* | 10/2013 | Kim | H04W 72/048 | 398/127 |
| 8,594,510 B2* | 11/2013 | Schenk | H05B 37/02 | 315/152 |
| 8,620,154 B2* | 12/2013 | Li | H04W 76/028 | 398/1 |
| 8,639,124 B2* | 1/2014 | Castor | H04B 10/1149 | 398/172 |
| 8,660,436 B2* | 2/2014 | Schenk | H05B 37/0272 | 315/294 |
| 8,831,438 B2* | 9/2014 | Park | H04B 10/1141 | 398/118 |
| 8,948,601 B2* | 2/2015 | Shar | H04B 10/1149 | 398/129 |
| 9,031,416 B2* | 5/2015 | Son | H04B 10/1149 | 398/127 |
| 2011/0069957 A1* | 3/2011 | Kim | H04B 3/542 | 398/75 |
| 2011/0091220 A1* | 4/2011 | Rajagopal | H04B 10/116 | 398/172 |
| 2012/0166658 A1 | 6/2012 | Kim et al. | | |
| 2013/0028612 A1* | 1/2013 | Ryan | G01S 1/70 | 398/172 |
| 2013/0202293 A1* | 8/2013 | Boyd | H04Q 11/0067 | 398/38 |
| 2014/0270791 A1* | 9/2014 | Hyde | H04B 10/116 | 398/118 |

FOREIGN PATENT DOCUMENTS

| | | |
|---|---|---|
| KR | 1020120060337 A | 6/2012 |
| KR | 1020120071117 A | 7/2012 |
| KR | 1020130068449 A | 6/2013 |

* cited by examiner

METHOD AND APPARATUS FOR MANAGING LINK ON MULTI-LAYER NETWORKS

CROSS-REFERENCE TO RELATED APPLICATION

The present application claims priority to Korean patent application number 10-2014-0074981, filed on Jun. 19, 2014, the entire disclosure of which is incorporated herein in its entirety by reference.

BACKGROUND

1. Field of Invention

Various embodiments of the present disclosure relate to a network, and more particularly, to a method and apparatus for managing a link in a network. The present disclosure was derived from a research conducted as part of an effort for developing a Tera-grade optical-circuit-packet integrated switching system for constructing a next generation optical transport network.

2. Description of Related Art

Future data and transport networks will consist of various network elements such as a router, switch, DWDM (dense wavelength division multiplexing) system, Add-Drop Multiplexor (ADM), PXC (Photonic cross-connect) or OXC (optical cross-connect) and the like.

Generalized Multiprotocol Label Switching (GMPLS) provides a control plane that has been expanded from that of MPLS to include switching and forwarding technologies and layers of a variety of devices. GMPLS developed to embrace not only Lambda switching but also other technologies. As a result of such generalization, networks realized by each of the technologies of time-division, lambda, and space switching (between ports or fibers) of a SONET ADM and so forth have been enabled to be connected by a single control plane.

GMPLS enables dynamic supply of network resources and supports survivability of networks using technologies such as network protection, restoration and so forth with a single control plane even in complexly configured network environment.

Besides switching by packets, GMPLS may support timeslot, wavelength or waveband, physical port or fiber switching as well. This means that new Label Switch Routers (LSRs), more specifically, new types of interfaces may be included in a GMPLS domain, which also means that there are Label Switched Paths (LSPs) consisting of circuits of other types of technologies.

The forwarding layer structure between LSPs is a concept already existing in MPLS, but GMPLS enables an LSP layer relationship between not only the same types of interfaces but also other types of interfaces.

SUMMARY

A first purpose of the present disclosure is to provide a link management method in a multi-layered network.

A second purpose of the present disclosure is to provide an apparatus for performing a link management method in a multi-layered network.

An embodiment of the present disclosure provides a method for managing a virtual link in a multi-layered network, the method including confirming whether or not set virtual TE link resources can be committed to a virtual TE (traffic engineering) link; in response to the set virtual TE link resources being committable to the virtual TE link, committing the resources to the virtual TE link through resource commitment; in response to the set virtual TE link resources being not committable to the virtual TE link, determining whether or not the virtual TE link is an adaptive virtual TE link; and in response to the virtual TE link being determined as the adaptive virtual TE link and the adaptive bandwidth satisfying TE link setting standards, committing the resources to the virtual TE link. The method may further include, in response to the virtual TE link being determined as the adaptive virtual TE link and the adaptive bandwidth not satisfying the TE link setting standards, or in response to the virtual TE link being determined as a fixed TE link, performing a process for when failing path computation. The method may further include putting a first weight to the virtual TE link in response to the set virtual TE link resources being committable to the virtual TE link, and putting a second weight to the virtual TE link in response to the virtual TE link resources being not committable to the virtual TE link and the virtual TE link being a fixed virtual TE link, the first weight being smaller than the second weight. The method may further include performing path computation based on the first weight and the second weight. The method may further include setting the virtual TE link and generating virtual TE link information, wherein virtual TE link information may include a virtual TE link ID, LSP bandwidth, ERO (explicit route objects), available bandwidth, virtual TE link Type, adaptive bandwidth, and weight information.

Another embodiment of the present disclosure provides a virtual network topology management apparatus for managing a virtual link in a multi-layered network, the apparatus including a processor for confirming whether or not set virtual TE link resources can be committed to a virtual TE (traffic engineering) link, wherein the apparatus is configured to confirm whether or not set virtual TE link resources can be committed to a virtual TE (traffic engineering) link; in response to the set virtual TE link resources being committable to the virtual TE link, to commit the resources to the virtual TE link through resource commitment on a data region; in response to the set virtual TE link resources being not committable to the virtual TE link, to determine whether or not the virtual TE link is an adaptive virtual TE link; and in response to the virtual TE link being determined as the adaptive virtual TE link and the adaptive bandwidth satisfying TE link setting standards, to commit the resources to the virtual TE link. The processor, in response to the virtual TE link being determined as the adaptive virtual TE link and the adaptive bandwidth not satisfying the TE link setting standards, or in response to the virtual TE link being determined as a fixed TE link, may perform a process for when failing path computation. The processor may be configured to put a first weight to the virtual TE link in response to the set virtual TE link resources being committable to the virtual TE link, and put a second weight to the virtual TE link in response to the virtual TE link resources being not committable to the virtual TE link and the virtual TE link being a fixed virtual TE link, the first weight being smaller than the second weight. The processor may be configured to perform path computation based on the first weight and the second weight. The processor may be configured to set the virtual TE link and generate virtual TE link information, the virtual TE link information including a virtual TE link ID, LSP bandwidth, ERO (explicit route objects), available bandwidth, virtual TE link Type, adaptive bandwidth, and weight information.

As aforementioned, by using a link management method and apparatus in a multi-layered network according to an embodiment of the present disclosure, it is possible to efficiently manage and control a virtual traffic engineering (TE) link, and use limited resources without a small change in a virtual network topology in a multi-layered network.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Hereinafter, embodiments will be described in greater detail with reference to the accompanying drawings. Embodiments are described herein with reference to cross-sectional illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, 'and/or' may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

In a multi-layered network, in a case where a higher-layer cannot be set as a Label Switched Path (LSP) due to lack of available resources, a lower-layer may be set as a Forwarding Adjacency (FA)-LSP and be used as a Traffic Engineering (TE) link of the higher-layer, so that resources of the entire network can be used efficiently.

A group of one or more lower-layer LSPs provides information necessary for efficiently handling paths in the higher-layer of the multi-layered network. That is, the group of one or more lower-layer LSPs may provide a virtual network topology (VNT) to the higher-layer.

For example, each group of LSPs being provided by a Lambda Switching Capability (LSC) LSP may provide one VNT to layers in a Packet Switching Capability (PSC) region based on an assumption that the PSC region will be connected to an LSC region. The VNT is configured according to setting or cancellation of lower-layer LSPs, and may be adjusted at a traffic request.

However, in a case where an FA-LSP is used as a higher TE link, a network topology of each layer is changed according to setting or cancellation of the FA-LSP, and this may cause a trade-off between efficient use of network resources and robustness of the network.

On the other hand, when using a virtual Traffic Engineering (TE) link, the FA-LSP is engaged on a control plane only and a TE link is set between to nodes at the higher-layer, while resources are not committed to an actual data plane of the lower-layer, thereby reducing the frequency of changing the net topology while using an available bandwidth efficiently.

The virtual Traffic Engineering (TE) link is advertised within one IGP (interior gateway protocol) region, and may be set as the FA-LSP at the lower-layer and used when required. That is, the virtual TE link is used as the FA-LSP at the lower-layer and as the TE link at the higher-layer through an actual resource commitment process afterwards.

The virtual TE link is set as the FA-LSP on the control plane only and is used as information for routing, while the actual lower-layer is not committed with resources.

Therefore, the lower-layer may use the resources set as the virtual TE link as available resources in traffic transport. Since the virtual TE link is used for routing of the higher-layer and as resources for traffic transport of the lower-layer, information on available bandwidth of the virtual TE link according to changes of the lower-layer resources that the virtual TE link contains must be reflected as routing information. Furthermore, when setting a path including the virtual TE link at the higher-layer, there may be a case where the lower-layer is already using the virtual TE link-related band, and thus the virtual TE link cannot be used as the FA-LSP. In this case, since the higher-layer cannot use the virtual TE link, it fails computing a transport path.

The present disclosure provides an efficient virtual TE link management and control method, and management information and process thereof in a multi-layered network.

Figure 1:
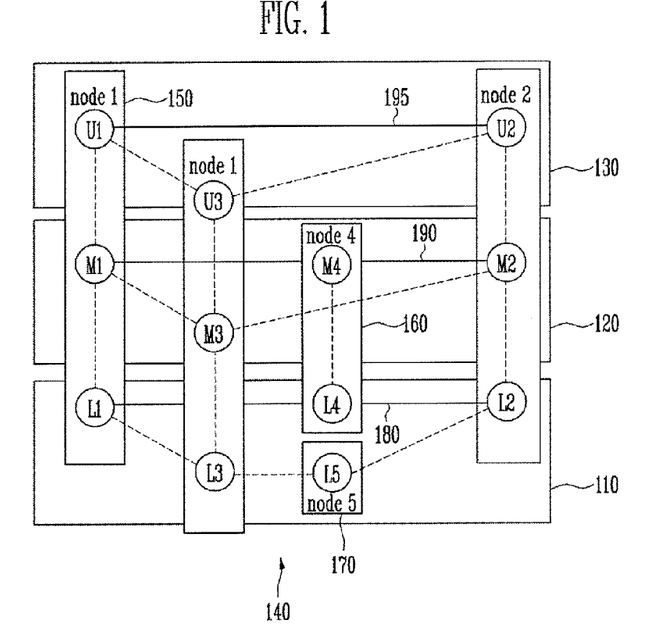
FIG. 1 shows a concept of a multi-layered network.

FIG. 1 is a view illustrating a concept of a multi-layered network.

Referring to FIG. 1, the multi-layered network may consist of three layers: a lower-layer, middle-layer, and higher-layer.

The lower-layer 110 (L1, L2) is a lowermost layer. For example, an optical transport network that provides transport resources of Lambda units may be the lower-layer.

The middle-layer 120 (M1, M2) is a higher-layer of the lower-layer 110 (L1, L2). For example, a TDM transport network that provides transport resources of time-sharing units according to a TDM (Synchronous Digital Hierarchy/Synchronous Optical Network) may be the middle-layer 120.

The higher-layer 130 (U1, U2) is an uppermost layer in the network illustrated. For example, a packet transport network that provides packet transport resources such as a PBB-TE (provider backbone bridge traffic engineering) or MPLS-TP (multi-protocol label switching transport profile) may be the higher-layer. The transport resources of the lower-layer 110, middle-layer 120, and higher-layer 130 may all be provided in one equipment, and in some cases, transport resources of only some of the layers may be provided in one equipment. In other words, there may be a node having all the transport resources of the lower-layer 110, middle-layer 120 and higher-layer 130, or there may be a node having the transport resources of the higher-layer 130 and middle-layer 120.

Herein, in a case of forming a network with the lower-layer 110, middle-layer 120, and higher-layer 130, this network will be called a multi-layered resource transport network 140 (or multi-layered network).

The multi-layered resource transport network 140 consists of at least one node. Herein, each node manages resources for at least one of the higher-layer 130, middle-layer 120, and lower-layer 110.

For example, node 1 150, node 2, and node 3 are capable of performing switching or controlling of the resources for all the higher-layer 130, middle-layer 120, and lower-layer 110. Furthermore, node 4 is capable of performing switching and controlling of resources for the middle-layer 120 and lower-layer 110 from among the higher-layer, middle-layer, and lower-layer. Node 5 170 is capable of performing switching and controlling of resources for the lower-layer 110. As each node (node 1 to node 5) has switching or controlling functions of the lower-layer 110, middle-layer 120 and higher-layer 130, it forms TE (traffic engineering) link resources 180, 190, 195 connected with an adjacent node, provides a transport path for services required in each layer through the link resources, and allows a TE link to be committed with data resources for a transport path of the higher-layer 130.

Figure 2:
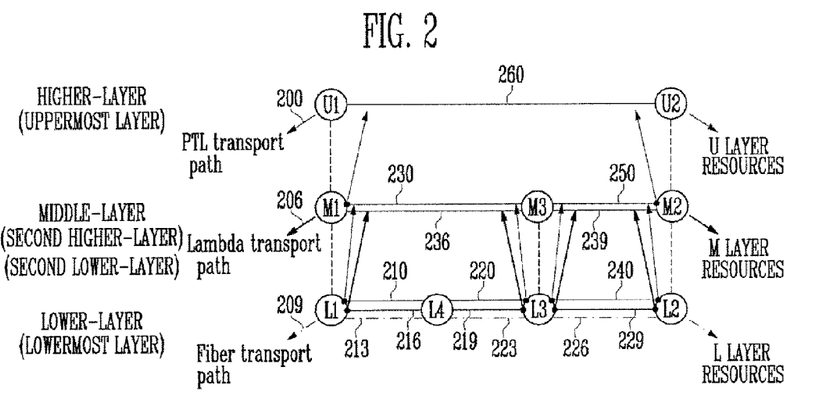
FIG. 2 shows a concept of an LSP.

FIG. 2 is a view illustrating a concept of LSP.

Referring to FIG. 2, L1 of node 1, L2 of node 2, L3 of node 3, and L4 of node 4 represent resources of the lower-layer, M1 of node 1, M3 of node 3, and M2 of node 2 represent resources of the middle-layer, and U1 of node 1, and U2 of node 2 represent resources of the higher-layer.

As illustrated in FIG. 2, it is possible to set a transport path 209 for the lower-layer by selecting a TE (Traffic Engineering)-link 213 of L1 and L4, TE link 223 of L4 and L3, and TE link resources 226 of L3 and L2 that are resources of the lower-layer. For example, the lower-layer transport path 209 may be a fiber transport path and provide exclusive line services of fiber units.

The middle-layer transport path 206 may be for example a Lambda transport path and provide exclusive line services of Lambda units. Such a transport path 206 of the middle-layer may be set by selecting the TE link 236 between M1 and M3 or TE link 239 between M3 and M2.

Herein, if the TE link 236 of the middle-layer between M1 and M3 is not set in advance or if a bandwidth for the setting is insufficient, the TE link 236 between the M1 and M3 may be formed through a path setting L1-L4-L3 of the lower-layer consisting of the TE link 216 for the middle-layer between L1 and L4 and the TE link 219 for the middle-layer between L4 and L3 at the lower-layer, that is the lower server layer of the middle-layer. Accordingly, the TE link 236 between M1 and M3 is provided as a combination of M1-L1-L4-L3-M3.

Such lower-layer path 216, 219 for the lower server set for the middle-layer may be managed as a TE link of the middle-layer where a higher client is located, and may be selected in a transport path setting process of the middle layer.

An LSP for client use may be a transport path 200 of a higher layer, for example, a PBB-TE transport path, that is a type of PTL (Packet Transport Layer). The LSP for client use may provide VPN services for the Ethernet and so forth. Herein, the TE link 260 between U1 and U2 may be selected and provided through the transport path 200 of the higher-layer.

Herein, if the U layer TE link 260 between U1 and U2 is not set in advance or if there is insufficient bandwidth for setting the TE link, the TE link 230 between U1 and U2 may be provided by setting the middle-layer between M1 and M2 consisting of the TE link 230 between M1 and M3 and the TE link 250 between M3 and M2 of the middle-layer that is a lower server layer for the higher-layer.

That is, a path being reset for U1 and U2 may be replaced by a path connected in order of M1, M3, and M2. Such a path 230, 250 of the middle layer by the lower server may be managed as the TE link of the higher-layer where the higher client belongs to, and may be selected in the transport path setting process of the higher-layer. That is, in the path (LSP) created by the GMPLS signaling protocol in the multi-layered network, there exist LSPs 209, 206, and 200 for exclusive user service.

Herein, of the LSPs for user service, as for the LSP 209 of the lower-layer, the LSP for paths between resources at the lower-layer: L1 and L4 213, L4 and L3 223, and L3 and L2 226 are set through the TE link, and as for the LSP 216 of the middle-layer, the LSP for paths between resources at the middle-layer: M1 and M3 236, and M3 and M2 239 are set through the TE link, and as for the LSP 200 of the higher-layer, the LSP corresponding to U1 and U2 260 is set through the TE link.

Herein, as the TE link necessary for path setting of the higher-layer, there exist an FA-LSP 236 of M1 and M3 that is the middle-layer 2 formed by the LSP 216 of L1 and L4 and the LSP 219 of L4 and L3, FA-LSP 239 of M3 and M2 formed by the LSP 229 between L3 and L2 of the lower-layer 1, FA-LSP 230 of M1 and M3 formed by the LSP 210 of L1 and L4 and the LSP 240 of L3 and L2, and FA-LSP 260 of U1 and U2 formed by the LSP 230 of M1 and M3 and the LSP 250 of M3 and M2.

Hereinafter, an efficient virtual TE link management and control method, and management information and procedure thereof according to an embodiment of the present disclosure will be explained.

Specifically, a virtual TE link management method and management information, virtual TE link updating method and information, virtual TE link information updating method, virtual TE link information updating procedure, adaptive virtual TE link concept and provision method, and adaptive virtual TE link management information will be explained.

Figure 3:
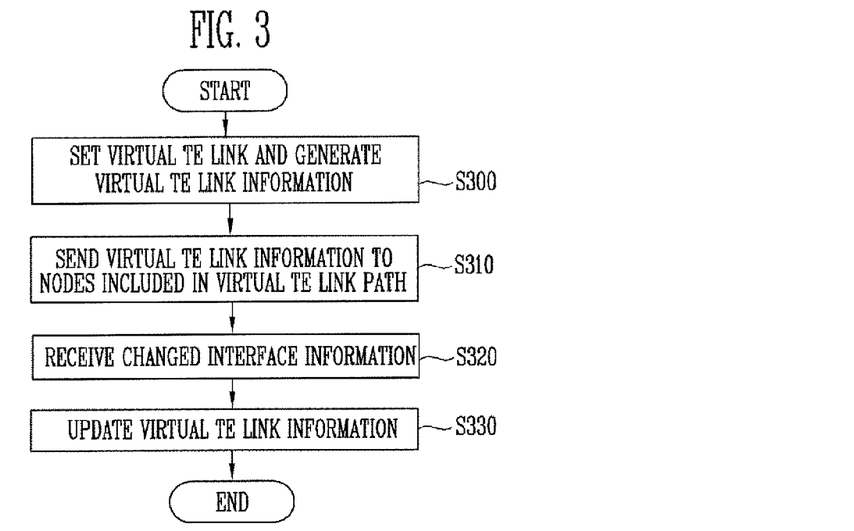
FIG. 3 is a flowchart of a method for managing a multi-layered network virtual TE link according to an embodiment of the present disclosure.

FIG. 3 is a flowchart illustrating a method for managing a virtual TE link in a multi-layered network according to an embodiment of the present disclosure.

Referring to FIG. 3, a virtual TE link is set, and virtual TE link information is created (S300).

The virtual TE link may be set by for example, a network operator or signaling. In a case of setting the virtual TE link, a virtual network topology management function module or apparatus (hereinafter referred to as 'virtual network topology management apparatus') such as a VNTM (virtual network topology manager) may create the virtual TE link information.

The virtual TE link information may include information on a virtual TE link ID, LSP bandwidth, ERO (explicit route objects), available bandwidth, virtual TE link type, adaptive bandwidth, and weight.

The virtual TE link ID may include ID information on the virtual TE link being managed in the virtual network topology management apparatus.

The ERO may include information on component nodes on a path configuring the virtual TE link.

The available bandwidth refers to the bandwidth that can be used in the current virtual TE link. The default value may be set to be the same as the LSP bandwidth.

The virtual TE link type may include ID information showing whether a virtual TE link will be used as an adaptive virtual TE link or fixed virtual TE link. For example, a virtual TE link may be differentiated between virtual TE links and fixed TE links, based on 1 and 0.

When the virtual TE link is a type of an adaptive virtual TE link, it may be set such that available resources during resource commitment are included in the adaptive bandwidth. Specifically, when the virtual TE link is a type of an adaptive virtual TE link, a bandwidth changed from the value included in the adaptive bandwidth depending on available bandwidth situations may be used as the TE link through resource commitment.

On the other hand, when the virtual TE link is a type of fixed virtual TE link, it will not manage information on the adaptive bandwidth, and when some of the current virtual TE link resources are used in data transport of the lower-layer, resource commitment cannot be performed, and thus the virtual TE link cannot be used as the TE link of the higher-layer.

Furthermore, the virtual TE link type is not necessarily a fixed value, but may be changed depending on circumstances. When information on the virtual TE link type changes, the information on such changes must be sent back to the nodes configuring the virtual TE link.

Putting weight is an option. It may be reflected in computing a path. For example, when the set bandwidth of the virtual TE link is larger than the currently available band, a very large weight may be put to the bandwidth so that it is excluded when computing the path. Furthermore, in the case of an adaptive virtual TE link, it is possible to put a different weight depending on a critical value or reference value of the available resources so that the smaller the available bandwidth, path selection is not made easily. In order to reflect weight information in computing a path, it is possible to send information updated as a change occurred in the weight value to a path computation module or apparatus.

Information on a set virtual TE link is sent to nodes included in the virtual TE link path (S310).

The network topology management apparatus may construct a virtual TE link information table based on virtual TE link information. Furthermore, the network topology management apparatus may send the virtual TE link information to the nodes included in the virtual TE link path.

For example, the network topology management apparatus may send information on the virtual TE link ID, LSP bandwidth, and virtual link type together with information on the LSP to each node. Such information may be sent to each node in various formats depending on the network configuration and information transmission method.

Step 310 may be omitted if each node already has the virtual TE link information when setting the virtual TE link through signaling.

The network topology management apparatus receives interface changed information from the node configuring the virtual TE link (S320).

For example, each node configuring the virtual TE link may send updated information to the network topology management apparatus every time the bandwidth of the interface where the virtual TE link belongs to changes. With the network topology management apparatus, it is possible to receive the changed interface information and update the virtual TE link information. Furthermore, the network topology management apparatus may reflect such updated information in routing.

Each node may update the virtual TE link information in various ways. For example, it is possible to have the changed virtual TE link information to be sent only when the bandwidth of the interface where the virtual TE link belongs to is smaller than the bandwidth committed to the virtual TE link. In this case, if the bandwidth of the interface where the virtual TE link belongs to is larger than the bandwidth committed to the virtual TE link, the changed information will not be reported to the network topology management apparatus.

It is possible to have the information on the virtual TE link ID, virtual TE link type, and available bandwidth to be included in the report to be sent to the network topology management apparatus when the bandwidth of the interface where the virtual TE link belongs to is smaller than the bandwidth committed to the virtual TE link. The network topology management apparatus may update the virtual TE link information based on the information on the virtual TE link ID, virtual TE link type, and available bandwidth received.

According to another embodiment of the present disclosure, when changed interface information of a node is needed as when the network topology management apparatus performs a path computation based on the virtual TE link information, a request for the changed interface information may be made to the node. In this case, the node may send the changed bandwidth information corresponding to the virtual TE link to the network topology management apparatus. For example, the node may send information on the virtual TE link ID, virtual TE link type, and available bandwidth to the network topology management apparatus at the request for the changed interface information made by the network topology management apparatus.

The network topology management apparatus updates the virtual TE link information (S330).

The virtual TE link may consist of one LSP including a plurality of nodes. For example, the network topology management apparatus may compute the minimum value of the available bandwidth of the interface configuring the LSP as the representative value of the corresponding virtual TE link and update information on the available bandwidth.

Furthermore, according to the embodiment of the present disclosure, when the virtual TE link is included in the path intended to be set at the higher-layer, the virtual network topology management apparatus may determine whether or not the virtual TE link may be used as the TE link of the higher-layer, and determine the possibility of setting the TE link.

Figure 4:
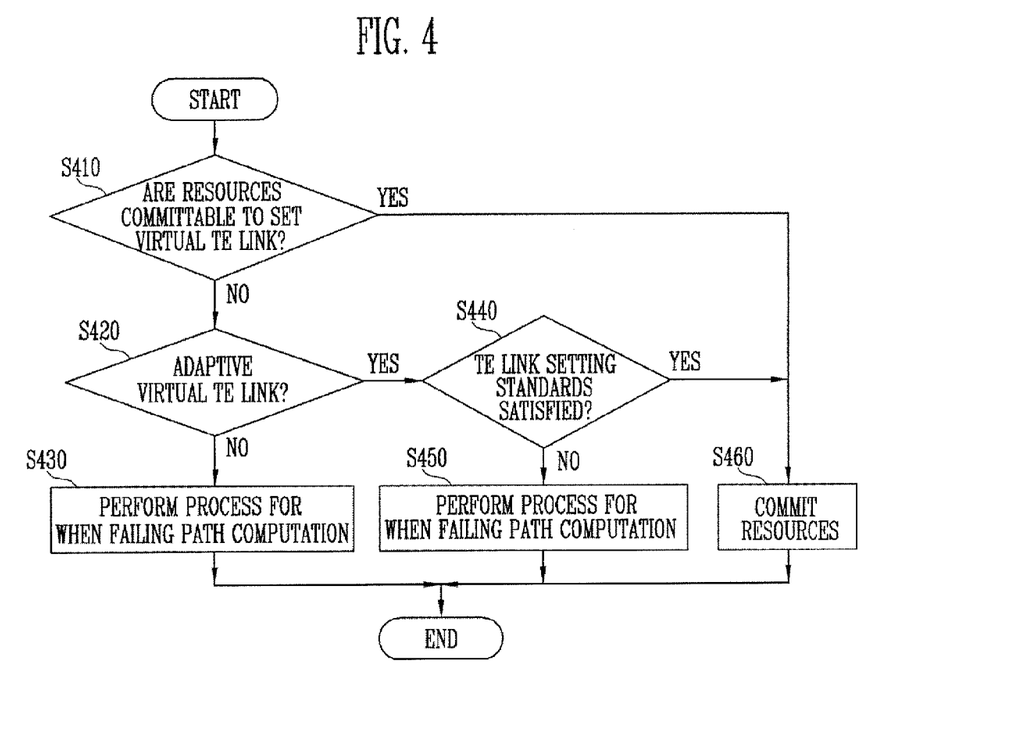
FIG. 4 is a flowchart of a method for determining a possibility of setting a TE link of a virtual TE link according to an embodiment of the present disclosure.

FIG. 4 is a flowchart illustrating a method for determining a possibility of setting a TE link of a virtual TE link according to an embodiment of the present disclosure.

Hereinafter, explanation will be made on a method for determining whether or not the set virtual TE link resources can be committed and whether or not setting standards of the virtual TE link of the higher-layer are satisfied, and then actually allocating the resources to the virtual TE link.

Referring to FIG. 4, the virtual network topology management apparatus confirms whether or not the set virtual TE link resources can be committed (S410).

Based on the set virtual TE link information, the virtual network topology management apparatus may determine whether or not it is possible to allocate the set virtual TE link resources. For example, when there are more available resources than the set virtual TE link resources, the virtual network topology management apparatus may determine that the virtual TE link resources can be committed. Furthermore, in the case of an adaptive virtual TE link, the virtual network topology management apparatus may determine that the virtual TE link resources can be committed as long as the TE link setting standards are satisfied even if the available resources are smaller than the virtual TE link resources.

In the case where the set virtual TE link resources can be committed, the actual resources are committed through resource commitment of the virtual TE link on a data plane (S460).

In the case where the set virtual TE link resources can be committed, the virtual TE link can actually be committed with resources based on determined resources on the data region.

In the case where the set virtual TE link resources cannot be committed, it is determined whether or not the virtual TE link type is an adaptive virtual TE link (S420).

For example, when the set virtual TE link resources are greater than the actual available resources, the virtual network topology management apparatus may determine whether or not the virtual TE link resources can be committed.

When the virtual TE link type is an adaptive virtual TE link as a result of determination of step 420, it is determined whether or not the adaptive bandwidth satisfies the TE link setting standards (S440).

At step 440, the TE link setting standards may be determined according to various requirements such as the required bandwidth and network situation and the like. For example, the virtual network topology management apparatus determines the available bandwidth situation and whether or not the available bandwidth satisfies a certain critical bandwidth, so as to determine whether or not the adaptive bandwidth satisfies the TE link setting standards.

If it is determined that the virtual TE link is an adaptive virtual TE link and the adaptive bandwidth satisfies the TE link setting standards, the virtual TE link can be committed with the actual resources through resource commitment of the virtual TE link on the data region (S460).

If it is determined that the virtual TE link is an adaptive virtual TE link and the adaptive bandwidth satisfies the TE link setting standards, the virtual TE link can be committed with the actual resources through resource commitment on the data region.

If it is determined that the virtual TE link is not an adaptive TE link as a result of determination at step 420, a process for when failing a path computation including a fixed virtual TE link is performed (S430).

That is, when the virtual TE link is not an adaptive TE link but a fixed virtual TE link, the TE link cannot be used due to lack of available resources of the lower-layer. Therefore, the process for when failing a path computation including the fixed virtual TE link can be performed. For example, the virtual network topology management apparatus notifies a path computation module or apparatus such as a PCE (path computation element) that path computation is not possible. A weight value may be updated depending on the embodiment method. For example, it is possible to put a very large weight to the fixed virtual TE link so as to be excluded in path computation.

When it is determined as a result of step 440 that the adaptive bandwidth of the virtual TE link does not satisfies the TE link setting standards, the virtual TE link cannot be used as the TE link of the higher-layer due to lack of resources, and thus a process for when failing the TE link resource commitment may be performed (S450).

The process for when failing the TE link resource commitment may for example, notify the path computation module or apparatus such as a PCE that path setting is not possible, and may perform a process of updating the weight value depending on the embodiment method.

As in step 460, in order to commit resources to the virtual TE link through resource commitment of the virtual TE link on the data region, the virtual network topology management apparatus may actually proceed with resource commitment process based on GMPLS signaling triggering.

In the case of resource commitment for an adaptive virtual TE link, a previously set bandwidth may be different from the bandwidth to be currently set. Therefore, a GMPLS based signaling message may further include information that the LSP to be set is an adaptive TE link and information on the changed bandwidth to be set.

For example, the GMPLS based signaling message may include an adaptation flag and adaptation bandwidth information. Furthermore, in a case of an OTN (optical transport network) layer, it is possible to express the information that the LSP is an adaptive virtual TE link and information on the changed bandwidth to be set based on TS (tributary slot) and signaling type information. Not only that, it is possible to signal the information that the LSP is an adaptive virtual TE link and information on the changed bandwidth to be set based on various information formats.

According to another embodiment of the present disclosure, at step 460, the GMPLS based signaling may not be used, but instead the virtual network topology management apparatus may send the information directly to each node configuring the virtual TE link and perform resource commitment. In this case, the message being sent from the virtual network topology management apparatus to the node may include information that this message is a message for resource commitment together with the LSP information.

The message being sent to the node may be, for example, resource commitment flag and virtual TE link ID and the like together with the LSP information. In the case of the OTN layer, such information may be expressed through a TS (tributary slot) and signaling type information and so forth. This method is another example, and thus may be configured by a portion of the information or by various combinations thereof depending on the embodiment method.

Figure 5:
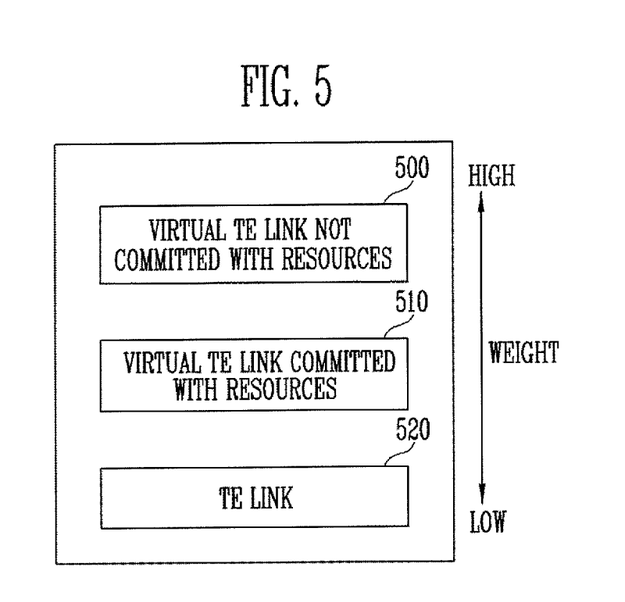
FIG. 5 shows a concept of a TE link and a method for putting weights to a TE link and selecting a link according to an embodiment of the present disclosure.

FIG. 5 shows a concept of a TE link and a method for putting weights to a TE link and selecting a link according to an embodiment of the present disclosure.

FIG. 5 illustrates the TE link and the method for performing path computation based on a weight put differently depending on the virtual TE link type.

The weight value may be determined through various algorithms, and the higher the weight, the higher the possibility of being excluded in path selecting. On the contrary, the lower the weight, the higher the possibility of being selected as the path.

As aforementioned with reference to FIG. 4, in the fixed or the adaptive virtual TE link having insufficient available bandwidth (or virtual TE link not committed with resources) 500, the virtual TE link to which the set bandwidth may be committed and the adaptive TE link having a smaller available bandwidth than the set virtual TE link bandwidth (or virtual TE link committed with resources) 510, and a general TE link 520, it is possible to increase or reduce the possibility of a certain link being selected according to network management policies by putting different weights depending on their types.

When intending to use the virtual TE link as the TE link, to the fixed virtual TE link 500 to which the set virtual TE link resources cannot be committed, resource commitment cannot be made. Therefore, it is used as the TE link of the higher-layer and thus cannot be used. Therefore, to such a virtual TE link, a very high weight may be put so that it may not be considered when computing the path.

On the other hand, to the fixed virtual TE link and/or adaptive virtual TE link to which the set virtual TE link resources can be committed, resource commitment can be made, and thus the fixed virtual TE link and/or adaptive virtual TE link can be committed is managed with a relatively high weight.

Furthermore, the adaptive virtual TE link to which the set virtual TE link resources cannot be committed but which satisfies the TE link setting standards may also be managed with a relatively high weight.

A weight of the virtual TE link to which the set virtual TE link resources can be committed and the adaptive virtual TE link having insufficient bandwidth may be adaptively determined according to the network management policies. That is, the virtual TE link to which the set virtual TE link resources can be committed may have a higher weight, and the adaptive virtual TE link having insufficient bandwidth may have a higher weight depending on the network management policies. Otherwise, an adaptive virtual link having insufficient bandwidth may be managed with a different weight based on a certain critical value according to the network management policies.

The TE link 520 may be managed with a lower weight than the virtual TE link.

As in the method disclosed in FIG. 5, by managing the virtual TE link with a weight, the virtual TE link can be easily managed without changing the virtual topology even when the actual available bandwidth is smaller than the set bandwidth. Furthermore, by reflecting the weight in the path computation, path selection can be made efficiently.

Figure 6:
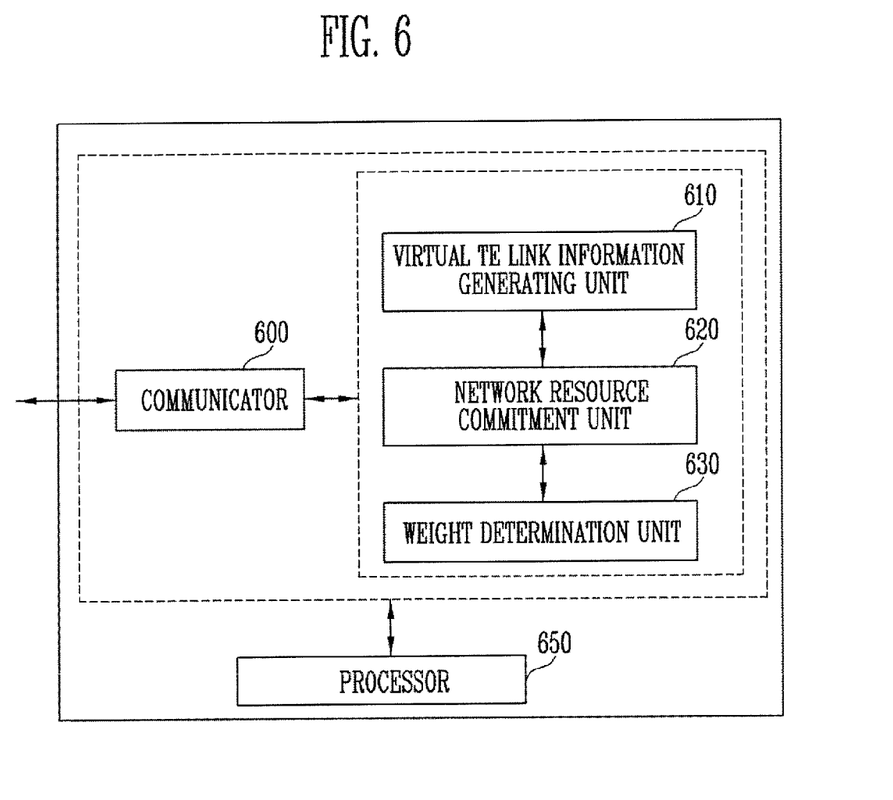
FIG. 6 illustrates a concept of a virtual network topology management apparatus according to an embodiment of the present disclosure.

FIG. 6 illustrates a concept of a virtual network topology management apparatus according to an embodiment of the present disclosure.

Referring to FIG. 6, the virtual network topology management apparatus may include a communicator 600, virtual TE link information generating unit 610, network resource commitment unit 620, weight determination unit 630, and processor 650.

The communicator 600 may be configured to transmit virtual TE link formation to a node and to receive updated information.

The virtual TE link information generating unit 610 may generate information on a set virtual TE link. The virtual TE link information may include a virtual TE link ID, LSP bandwidth, ERO, available bandwidth, virtual TE link type, adaptive bandwidth, and weight information. Furthermore, the virtual TE link information generating unit 610 may receive updated information from the node and update the virtual TE link information.

The network resource commitment unit 620 may determine whether or not the set virtual TE link resources can be committed and whether or not the setting standards of the virtual TE link of the higher-layer are satisfied, and then commit the actual resources to the virtual TE link. The network resource commitment unit 620 may commit the actual resources through resource commitment of the virtual TE link on the data region.

The weight determination unit 630 may determine a weight for each of the fixed virtual TE link to which the set virtual TE link resources cannot be committed, adaptive virtual TE link, and the virtual TE link to which the set virtual TE link resources can be committed.

The processor 650 may be configured to control operations of the communicator 600, virtual TE link information generating unit 610, network resource commitment unit 620, and weight determination unit 630.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method for managing a virtual link in a multi-layered network, the method comprising:
confirming whether or not set virtual TE link resources can be committed to a virtual TE (traffic engineering) link;
in response to the set virtual TE link resources being committable to the virtual TE link, committing the resources to the virtual TE link through resource commitment;
in response to the set virtual TE link resources being not committable to the virtual TE link, determining whether or not the virtual TE link is an adaptive virtual TE link; and
in response to the virtual TE link being determined as the adaptive virtual TE link and the adaptive bandwidth satisfying TE link setting standards, committing the resources to the virtual TE link.

2. The method according to claim 1,
further comprising, in response to the virtual TE link being determined as the adaptive virtual TE link and the adaptive bandwidth not satisfying the TE link setting standards, or in response to the virtual TE link being determined as a fixed TE link, performing a process for when failing path computation.

3. The method according to claim 2,
further comprising, putting a first weight to the virtual TE link in response to the set virtual TE link resources being committable to the virtual TE link, and
putting a second weight to the virtual TE link in response to the virtual TE link resources being not committable to the virtual TE link and the virtual TE link being a fixed virtual TE link, the first weight being smaller than the second weight.

4. The method according to claim 3,
further comprising performing path computation based on the first weight and the second weight.

5. The method according to claim 1,
further comprising setting the virtual TE link and generating virtual TE link information,
wherein the virtual TE link information includes a virtual TE link ID, LSP bandwidth, ERO (explicit route objects), available bandwidth, virtual TE link Type, adaptive bandwidth, and weight information.

6. A virtual network topology management apparatus for managing a virtual link in a multi-layered network, the apparatus comprising:
a processor for confirming whether or not set virtual TE link resources can be committed to a virtual TE (traffic engineering) link,
wherein the apparatus is configured to confirm whether or not set virtual TE link resources can be committed to a virtual TE (traffic engineering) link;
in response to the set virtual TE link resources being committable to the virtual TE link, to commit the resources to the virtual TE link through resource commitment on a data region;
in response to the set virtual TE link resources being not committable to the virtual TE link, to determine whether or not the virtual TE link is an adaptive virtual TE link; and
in response to the virtual TE link being determined as the adaptive virtual TE link and the adaptive bandwidth satisfying TE link setting standards, to commit the resources to the virtual TE link.

7. The apparatus according to claim 6,
wherein the processor, in response to the virtual TE link being determined as the adaptive virtual TE link and the adaptive bandwidth not satisfying the TE link setting standards, or in response to the virtual TE link being determined as a fixed TE link, performs a process for when failing path computation.

8. The apparatus according to claim 6,
wherein the processor is configured to put a first weight to the virtual TE link in response to the set virtual TE link resources being committable to the virtual TE link, and put a second weight to the virtual TE link in response to the virtual TE link resources being not committable to the virtual TE link and the virtual TE link being a fixed virtual TE link, the first weight being smaller than the second weight.

9. The apparatus according to claim 8,
wherein the processor is configured to perform path computation based on the first weight and the second weight.

10. The apparatus according to claim 6,
wherein the processor is configured to set the virtual TE link and generate virtual TE link information,
the virtual TE link information including a virtual TE link ID, LSP bandwidth, ERO (explicit route objects), available bandwidth, virtual TE link Type, adaptive bandwidth, and weight information.

* * * * *